J. B. SPEED.

CHECK BOOK AND THE LIKE.

APPLICATION FILED JULY 31, 1911.

Reissued Dec. 19, 1911.

13,342.

WITNESSES

N. B. Keating

Leon Bollot

INVENTOR

J. B. Speed

By F. M. Wright his attorney.

COLUMBIA PLANOGRAPH CO., WASHINGTON, D. C.

UNITED STATES PATENT OFFICE.

JAMES BUCKNER SPEED, OF BERKELEY, CALIFORNIA, ASSIGNOR OF ONE-HALF TO EARLL H. WEBB, OF BERKELEY, CALIFORNIA.

CHECK-BOOK AND THE LIKE.

13,342. Specification of Reissued Letters Patent. Reissued Dec. 19, 1911.

Original No. 997,471, dated July 11, 1911, Serial No. 522,300. Application for reissue filed July 31, 1911. Serial No. 641,678.

*To all whom it may concern:*

Be it known that I, JAMES BUCKNER SPEED, a citizen of the United States, residing at Berkeley, in the county of Alameda and State of California, have invented certain new and useful Improvements in Check-Books and the Like, of which the following is a specification.

My invention relates to that class of books which contain what may be generically termed commercial instruments, whether bank checks, bills, account, tickets, coupons, or any other like evidences of rights or property, or instruments of mercantile or commercial transactions.

My invention has for its object the provision of a book in which each leaf comprises a plurality of commercial instruments and corresponding recording instruments, for recording memoranda of the respective commercial instruments, said recording instruments being generally, but not necessarily, in the form of stubs, detachable from their respective commercial instruments, said instruments being so arranged relatively to each other that the separation of any individual commercial instrument from the leaf will result in the full exposure of the next succeeding commercial instrument and its recording instrument, thereby effecting the desirable result of leaving all previous recording instruments in visual array, and, finally, when the last commercial instrument is separated, presenting the leaf as a series of exposed records, for the various purposes of reference, comparison, calculation, posting, or other use to which the information of said records may be put.

By way of illustration of the invention, I shall describe and show that form thereof in which the recording instruments are in the form of stubs, detachably connected to commercial instruments, which I shall herein show as checks.

Figure 1:
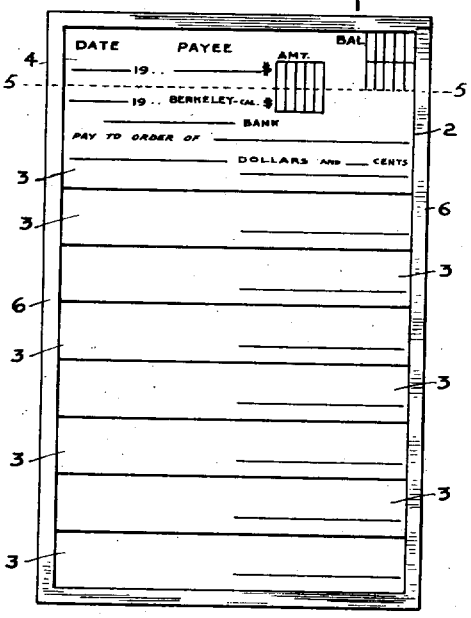
Figure 2:
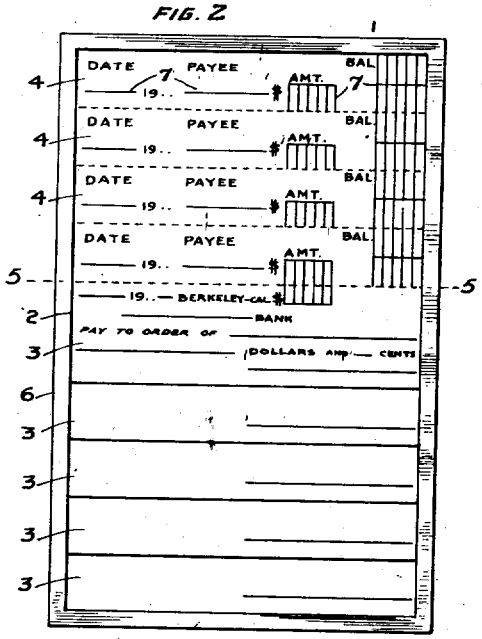
Figure 5:
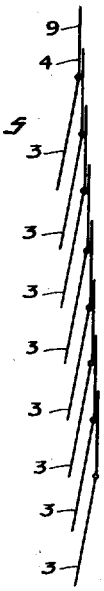
Figure 4:
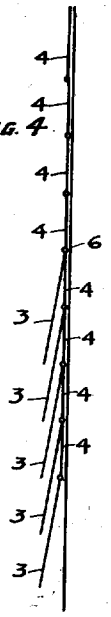
Figure 3:
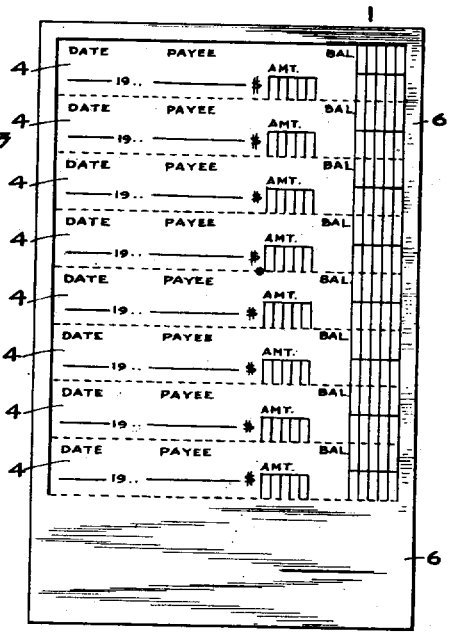

In the accompanying drawings, Figure 1 is a face view of a leaf of my check-book before any of the body portions of the instruments have been torn out. Fig. 2 is a similar view showing some of the body portions separated, leaving the previous stubs exposed. Fig. 3 is a similar view showing all the body portions removed, leaving the leaf a simple array of stubs. Fig. 4 is an edge view of the leaf of Fig. 2. Fig. 5 is an edge view showing each stub portion provided with a special securing or pasting strip.

1 is a leaf which is to be part of a suitable aggregation of similar leaves, which are to form a book.

2 are bank-checks, each check being composed of a body portion 3 and a stub or recording instrument 4, the two portions being separable along the perforated line 5—5. The stub 4 is suitably printed, as shown at 7, to indicate blank spaces for recording memoranda of the check.

In the form of checks shown in Figs. 1 to 4, each combined check and stub is coextensive with the paper on which it is printed and the arrangement is as follows:—6 is a backing, say, a sheet of some suitable material. The lowermost check is pasted or otherwise secured by its stub to the backing sheet 6 near its lower portion, in such position that the lower edge of the check is at or near the line of the lower edge of sheet 6. The next check is secured by its stub to sheet 6, in such wise that the perforated line is about coincident with the upper edge of the stub of the lower check. In like manner the third check is secured relative to the second, and so on up the backing sheet, until the uppermost check is placed, and this check, as seen in Fig. 1, is the only one which is in full view. The checks are thus superposed on one another in a linear vertical series, the stubs or recording instruments forming a similar series, and the checks are connected to the stubs in such positions, that the upper edges of the successive checks register with, or overlie, the lines of separation of stubs of successive pairs. When the uppermost check is ready to be issued, and its stub has been filled out, it is torn off leaving the pasted stub. This separation of the first check exposes the entire second check and its stub. There will then be left two pasted stubs, both in sight, to-wit:—The first stub and the second stub; and the removal of the second check will leave exposed the third check and its stub; and so on, until the appearance of the leaf, shown in Fig. 2, is reached; and finally, that shown in Fig. 3 is attained, when all the body portions are removed and all the stubs remain in visual array, to be posted, computed, compared or otherwise dealt with as required.

In Fig. 5 I show the sheets on which the instruments are printed, as having, above the stubs 4, a continuing portion, designated by 9, which serves as, and may be termed, a pasting or securing strip. This provides for pasting the sheets directly onto one another, even without a backing sheet, though, for the sake of clearness, the pasting material which is supposed to secure the portions 9 to the back of the overlying stub, is omitted in said Fig. 5.

I claim:—

1. In a stub book, a leaf composed of a series of superposed commercial instruments, the body of each of said instruments being separable from its corresponding stub, said instruments being secured in the series in successively rising lines from the bottom of the series to the top, in such position that the line of separation of the body of an overlying instrument is coincident with the upper edge of the stub of the adjacent underlying instrument.

2. In a stub-book, a leaf composed of a series of superposed commercial instruments, each comprising a stub portion and a body portion separable from the stub portion, said instruments being secured in the series by their stub portions in successively rising lines from the bottom of the series to the top, in such position that the line of separation of the two portions of an overlying instrument is coincident with the upper edge of the stub portion of the adjacent underlying instrument.

3. In a stub-book, a leaf composed of a backing sheet, and a series of superposed commercial instruments, each comprising a stub portion and a body portion separable from the stub portion, said instruments being secured by their stub portions to the backing sheet, in successively rising lines of said sheet from the bottom to the top, in such position that the line of separation of the two portions of an overlying instrument is coincident with the upper edge of the stub portion of the adjacent underlying instrument.

4. In combination, a linear series of connected recording instruments, each suitably printed to indicate blank forms for recording thereon memoranda of the hereinafter recited commercial instruments, and commercial instruments identified with the several recording instruments superposed on one another in linear series, and detachably connected to the first series in such positions that similarly located edges of successive commercial instruments register with, or overlie, similarly located parts of successive recording instruments.

5. In combination, a linear series of connected recording instruments, each suitably printed to indicate blank forms for recording thereon memoranda of the hereinafter recited commercial instruments, and commercial instruments identified with the several recording instruments superposed on one another in linear series, and detachably connected to the first series in such positions that similarly located edges of successive commercial instruments register with, or overlie, parts intervening between recording instruments of successive pairs.

JAMES BUCKNER SPEED.

Witnesses:

N. B. Keating,

Francis M. Wright.

Copies of this patent may be obtained for five cents each, by addressing the "Commissioner of Patents, Washington, D. C."